April 28, 1931.  N. S. HILLYARD  1,802,509
CONTAINER
Filed Aug. 19, 1927
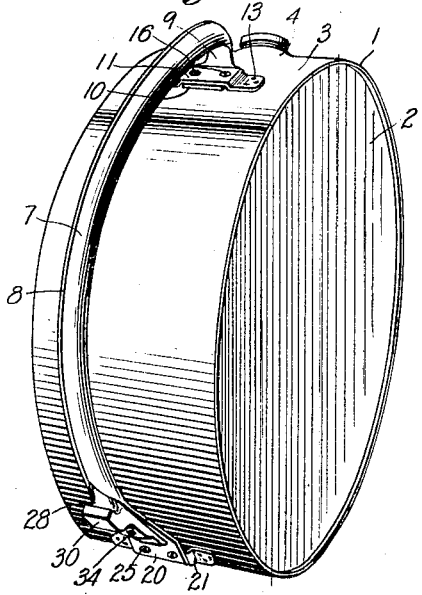
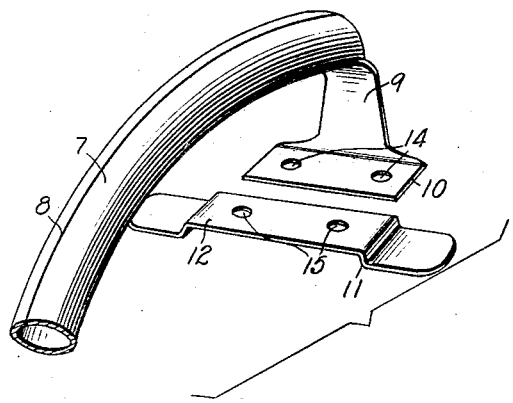
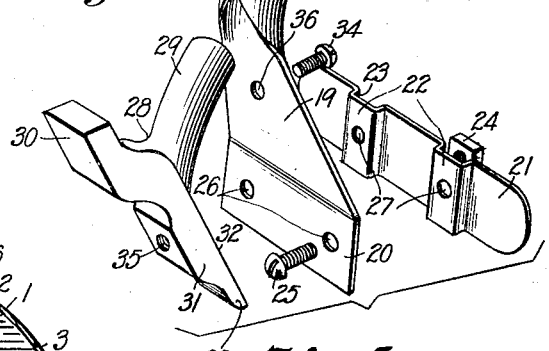
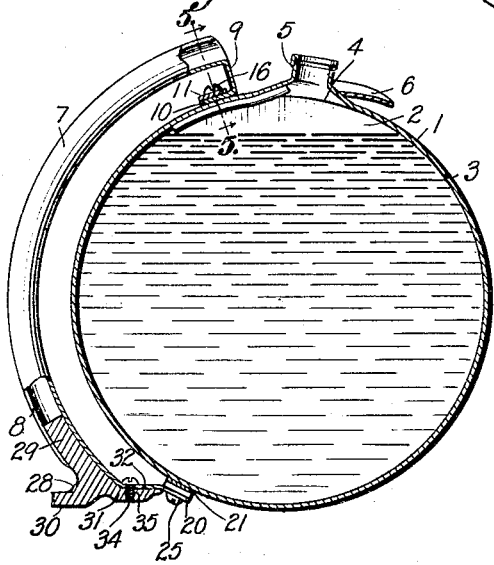
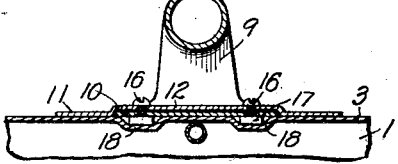
INVENTOR
Newton S. Hillyard
BY
ATTORNEY Patented Apr. 28, 1931

1,802,509

UNITED STATES PATENT OFFICE

NEWTON S. HILLYARD, OF ST. JOSEPH, MISSOURI

CONTAINER

Application filed August 19, 1927. Serial No. 214,087.

My invention relates to liquid containers and more particularly to means for attaching a handle to a cylindrical container, the objects of the invention being to effect firm, rigid and stable, while removable, attachment of a handle to a container while improving the neatness and attractiveness of the engagement, and to provide for removable association of a container-positioning weight that may serve as a stabilizing element with said handle-securing means.

In accomplishing these objects I have provided improved details of structure, the preferred forms of which are illustrated in the accompanying drawings, wherein:

Fig. 1 is a perspective view of a cylindrical container having a tubular handle attached thereto by means including my invention.

Fig. 2 is a vertical, longitudinal, central section of the container through the handle attaching means.

Fig. 3 is a detail, fragmentary, perspective view of the upper end of the handle and bracket for latching the same to the container.

Fig. 4 is a fragmentary perspective view of the lower end of the handle, the bracket whereby it is connected to the container and the weight associable with the bracket-engaging wing of the handle.

Fig. 5 is a section of the handle, tank and engaging means on the line 5—5, Fig. 2.

Referring in detail to the drawings:

1 designates a cylindrical container comprising the flat side walls 2 and the cylindrical enclosing wall 3, the cylindrical wall having an outlet 4 provided with the nipple 5 and pouring spout 6, and 7 designates an elongated, tubular handle.

The tubular handle is preferably made of sheet metal bent over longitudinally and producing a seam 8 at its meeting edges, the upper end of the handle having a preferably integral flange or plate 9 for spacing the handle from the container wall, and a widened end plate portion or wing 10 extending preferably retractively and longitudinally from the end of the handle, and adapted for engagement with the cylindrical wall of the container at a point adjacent the outlet through the provision of a socket or bracket element 11 consisting of a strap having an upwardly offset middle portion 12. When the strap is installed preferably by welding as shown at points 13, transversely of the cylindrical wall adjacent the outlet, the wing of the flange 9 may be inserted under the offset portion of the strap and will tend to retain the handle in engagement with the container. Bolt openings 14 and 15 are provided in the wing of the flange and in the strap, to receive bolts 16 which, with the co-operation of nuts 17, secure the upper end of the handle and the strap together for removable engagement of the handle with the container.

The winged portion of the handle flange is permitted to lie flat on the wall of the container and to slide snugly under the offset portion of the strap, by reason of sockets or squared recesses 18 formed in the cylindrical wall of the container, as disclosed in Fig. 5, to receive the nuts 17 preliminarily to the installation of the handle flange wing and engaging bolt, the sockets restraining the nuts from rotation upon insertion and enforcement of the bolts.

The lower end of the handle is provided with a flattened plate member or flange 19, having a widened plate member or wing 20 extending at an obtuse angle longitudinally and outwardly from the handle, the flange being provided for spacing the rear or lower end of the handle suitably from the container, and the wing extending preferably relatively parallel with the cylindrical wall, being provided for mounting the lower end of the handle in secure engagement with the container.

Secured to the cylindrical wall of the container preferably by welding is a bracket or strap 21, positioned transversely of the cylindrical wall to receive the lower end of the handle, the strap 21 having upwardly offset portions 22 producing sockets 23, which serve as retaining members for nuts 24 positioned in the sockets suitably to receive bolts 25 projectible through openings 26 and 27 of the handle wing 20 and strap 21. The nuts are restrained from rotation during installation of the bolts by the straight-sided socketed offset portions of the strap as described.

The elongated tubular handle is provided as described in spaced relation with the container for convenient manipulation of the container. A foot element 28 is provided for removable association with the securing members mentioned which serves the purposes of a weight and a supporting element. The element 28 is formed of relatively heavy material and is preferably solid and comprises a cylindrical shank member 29 adapted for insertion into the lower portion of the tubular handle as disclosed in Fig. 2, a heel portion 30 extending rearwardly of the container and in a plane parallel with its side walls, and a toe 31 having an upper flat face 32 so produced and arranged that it fits snugly over the flange 19 in such a manner that the extreme point 33 of the toe is engaged in the obtuse angle referred to above whereon the wing 20 of the flange 19 is bent therefrom.

A bolt 34 extending through openings 35 in the foot element and 36 in the flange 19 secures the foot element to the lower end of the handle in engagement with the said flange while the point of the toe bears against the joint of the flange with the wing.

The elements described may be economically manufactured, and having been constructed and provided as described, they may be conveniently and efficiently assembled and secured for functioning of the container. The upper strap with which the upper end of the handle is to be engaged provides a firm and strong means for retaining the rearwardly bent wing of the handle, and the provision of the sockets for the securing nuts permits of a close and stable attachment of the handle to the container. The handle being latched by insertion into the offset strap is easily engaged with the container and removable therefrom, whether by the bolts or merely by the latching of its flange wing in the socket element. The welded strap having the offset nut sockets, and the flat wing of the flange, provide means for snug and stable engagement of the lower end of the handle with the container from which engagement the handle is easily removable.

The nuts securing the bolts at each handle end are covered and thus are not only removed from sight for the sake of appearance but protected from damage and deterioration of parts. The nuts being held in the sockets of the straps 11 and 21, provide efficient retaining means, and cannot be accidentally dislodged. The nuts are supported in the sockets against loss upon removal of the bolts.

The weight or foot element having the rearwardly extending heel and the cylindrical shank which extends rearwardly from the vertical diameter of the container into the tubular handle, provides a lever, or a weight at the end of a relatively long lever arm, for tending to tilt the container rearwardly and for returning the container to normal rest position when the container may have been tilted forwardly in use, or may have been positioned after use with the outlet in a forward position. The heel of the weight element provides also the stabilizing or retaining element whereby the container is prevented from rearward tilting beyond normal rest position, and co-operates with the lower portion of the cylindrical wall of the container in rest position to support the container in such rest position.

What I claim and desire to secure by Letters Patent is:

1. In a control device for a liquid container comprising a tiltable cylindrical body provided with a pouring opening and adapted for seating on its curved wall in non-pouring position and having a curved elongated handle for rotating the container in pouring direction, means for removably securing the handle to the body comprising straps secured transversely to the curved wall of the body having outwardly offset portions, respectively adjacent and opposite said pouring opening, flanged portions of the handle adapted for engagement with said offset portions of the straps, and a weighted member adapted to return the body to non-pouring position secured exteriorly to one of said flanged portions.

2. In combination with a rotatable receptacle having a curved face for tilting movement of the receptacle on a supporting surface, a pouring opening at the upper end of said face, and a tubular handle attached to said receptacle by supporting end flanges on the handle, means for weighting the receptacle for restraining the same in rest position comprising a weight having a cylindrical shank for insertion in the tubular handle, a toe portion engageable with one of said supporting flanges, a heel portion extending tangentially from said curved face of the receptacle, and means for removably securing the weight to the handle.

3. In control means for a rotatable container having a curved wall, a pouring opening at the upper end of said wall, and a tubular handle for rotating the same provided with upper and lower end flanges connected to the container, means for stabilizing the receptacle in rest position including a weight having a cylindrical shank for engagement with the lower end of the tubular handle, a toe portion engageable with the one of said flanges on the lower end of the handle, a heel portion extending substantially rearwardly from the container, and means for securing the weight to the handle.

4. In combination with a cylindrical container adapted for rotating on its curved wall, and having a pouring opening, a tubular, curved, elongated handle arranged adjacent the periphery of the curved wall and plates spacing the handle from the curved wall, and attaching the handle thereto including a plate substantially opposite said pouring opening, means adapting the handle for supporting the container in rest position including a weight having a cylindrical body for insertion into the tubular handle, a heel portion extending rearwardly to a substantial degree from the handle, and means for removably securing the weight to the handle.

5. In a device of the character described, including a container having a cylindrical wall provided with a spout, and a handle secured to the wall having a tubular portion and a weight comprising a shank for insertion in the tubular portion of the handle, a heel adapted to extend outwardly from the handle exteriorly thereto, to engage a surface on which the container is positioned and a toe extending oppositely to the heel, and means for securing the toe to the wall.

6. In a device of the character described including a container having an arcuate seating wall provided with a pouring opening and adapted to rock on said wall forwardly from rest position to pouring position, a weight comprising a toe portion secured to the container, substantially diametrically opposite said pouring opening, a heel portion projecting rearwardly from the toe portion and adapted to engage a surface on which the container is positioned for stopping the rearwardly rocking container in rest position, and a portion extending upwardly rearwardly from the toe portion for returning the container to rest position.

In testimony whereof I affix my signature.
NEWTON S. HILLYARD.